MEANS AND TECHNIQUES FOR RECORDING AND REPRODUCING SOUND

Filed Feb. 25, 1957

INVENTOR.
ROBERT E. YOUELL

BY Lyon & Lyon

ATTORNEYS

United States Patent Office 3,021,393
Patented Feb. 13, 1962

3,021,393

MEANS AND TECHNIQUES FOR RECORDING AND REPRODUCING SOUND

Robert E. Youell, 4313 Camellia Ave., North Hollywood, Calif.

Filed Feb. 25, 1957, Ser. No. 641,941
11 Claims. (Cl. 179—100.1)

The present invention relates to improved means and techniques for recording and reproducing sound.

In general, the recording and reproducing system described herein involves an electroplating process in which sound is recorded or reproduced, as the case may be. The electrolytic cells provided in each of the arrangements described are reversible in that a recording is made while the electrodes are connected in a positive-negative sense and the subsequent reproduction is accomplished by reversing the potential at such electrodes.

It is therefore a general object of the present invention to provide an improved recording and reproducing system involving an electro-plating process.

A specific object of the present invention is to provide a recording and reproducing system in which a disc is rotated in an electrolytic bath and the coating applied to such disc while rotating has sound recorded thereon in layers; and in the reproduction process the previously electro-coated layers are removed as well as the recorded sound information.

Another specific object of the present invention is to provide an improved recording system involving bi-metals of the proper equilibrium potentials in an electrolytic cell in which the relative amounts of such bi-metals as deposited during the recording process or removed during the reproduction process are representative of recorded and subsequently reproduced sound.

Another specific object of the present invention is to provide a system of the character described in the preceding paragraph in which an electrode system such as a calomel electrode is placed in the cell for purposes of "modulating" the stream of metal in the recording process, and to develop a voltage representative of the prerecorded sound during the reverse flow of the metal in the reproduction process.

Another specific object of the present invention is to provide a system of the character indicated in the second preceding paragraph in which a coil or transformer is connected in the electrode circuit to impress a "modulating" current in the recording process and to develop a voltage in the subsequent reproduction process.

Another specific object of the present invention is to provide a system of the character indicated in the third preceding paragraph in which a light source and photocell is used to register or measure the varying texture of the plated surface.

Another specific object of the present invention is to provide a system as set forth in the fourth preceding paragraph involving radioactive materials.

Another specific object of the present invention is to provide a recording system using an electroplating process instead of magnetic tape records, drums or other devices normally used for this purpose.

Another specific object of the present invention is to provide a system of this type involving two electrolytic cells interconnected so that when sound reproduction is obtained from one cell the sound is simultaneously recorded or stored in an interconnected cell.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1, 2, 3, 4, 5, 6:
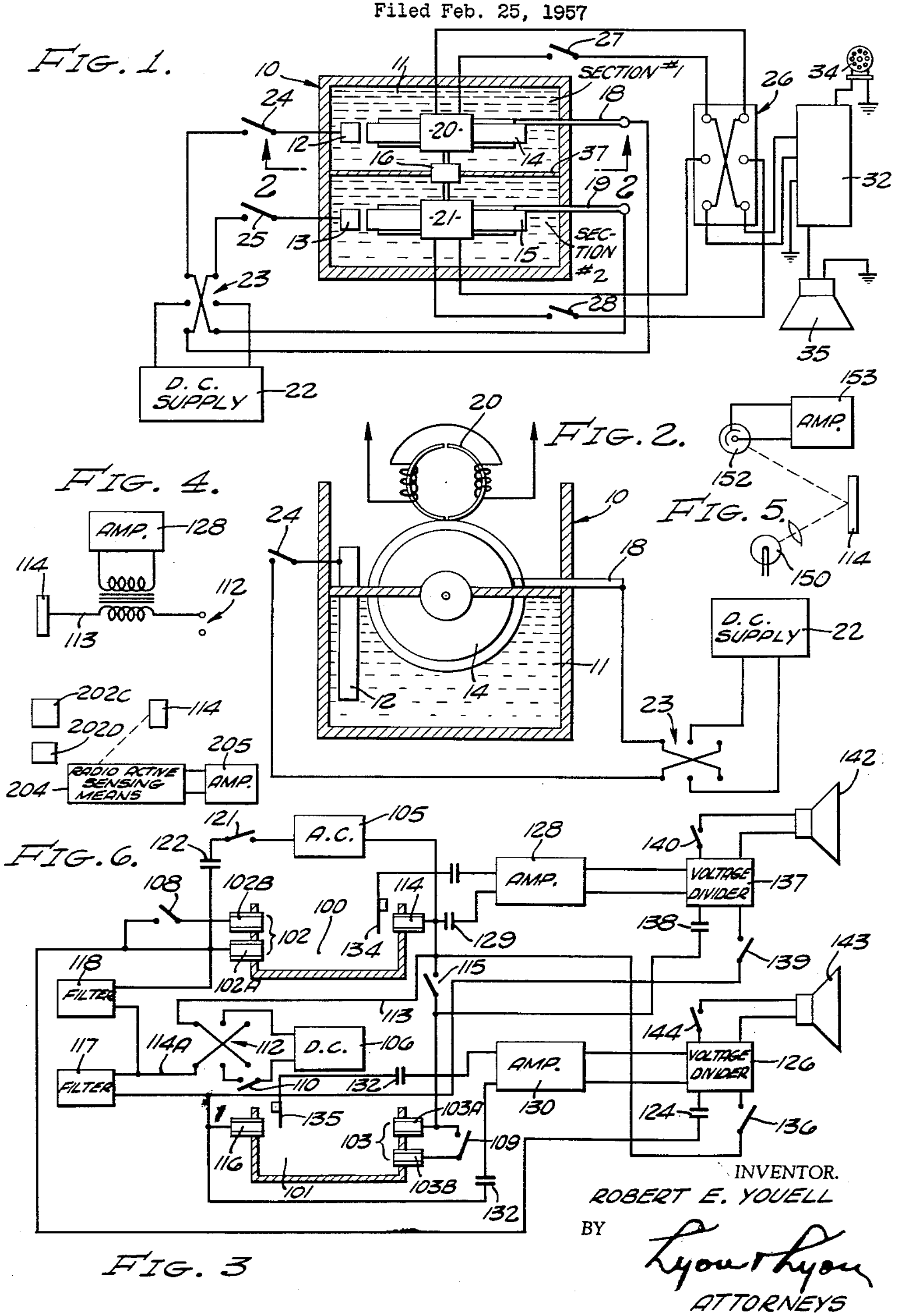
FIGURE 1 is a top plan view of an electroplating cell with apparatus therein and interconnected electrically in accordance with features of the present invention.
FIGURE 2 is a sectional view taken generally on the line 2—2 of FIGURE 1 with some of the circuitry duplicated.
FIGURE 3 illustrates another form of the present invention.
FIGURES 4, 5 and 6 illustrate different manners in which the system shown in FIGURE 3 may be modified, also in accordance with the features of the present invention.

Referring to the system shown in FIGURES 1 and 2, it includes an electrolytic container 10 which may be suitably partitioned and is of nonconductive material. The container 10 contains an electrolyte 11. A pair of stationary electrodes 12 and 13 are immersed in the electrolyte. A pair of metal discs 14 and 15 are also immersed in the electrolyte and are rotated by a common drive motor 16. Each of the discs 14 and 15 is in contact with corresponding brushes 18 and 19, which extend through the container 10 for electrical connection to the circuitry presently described.

Each of the discs 14 and 15 is magnetically associated with a combination recording and reproducing head 20 and 21, as illustrated in FIGURE 2. The recording heads are preferably positioned out of the electrolyte, as shown in FIGURE 2.

The electrodes 12 and 13 are connected to opposite terminals of the direct current voltage source 22 through a reversing switch 23 and also through individual on-off switches 24 and 25. The brushes 18 and 19 are connected to opposite terminals of the same source 22 through the same reversing switch 23.

The two leads of the head 20 are connected to the reversing switch 26 through the on-off switch 27; and similarly the two leads of the head 21 are connected through the on-off switch 28 to the same reversing switch 26. The function of the reversing switch 26 is to connect the heads 20 and 21 to an amplifier 32 either for recording sound or for reproducing sound. The amplifier 32 has a microphone 34 connected thereto for sound recording and a speaker 35 connected thereto for sound reproduction. In operation of the system shown in FIGURES 1 and 2, a recording is made with one of the switches 24, 25 closed and reversing switch 23 positioned so as to make the corresponding electrode 12 or 13 of magnetic material positive and the discs 14 and 15 of negative potential. The discs 14 and 15 are rotated by the motor 16 and the face of the discs has magnetic material plated thereon. As only one of the switches 24, 25 is closed at this time, this plating action takes place only on one disc 14 or 15, in one section of the container. The corresponding combination recording and reproducing head 20, 21 in the same section is conditioned for recording by proper positioning of the reversing switch 26. The sound signal from the signal source or microphone 34 after amplification in the amplifier 32 is magnetically recorded onto the plated surface on the corresponding rotating disc as it moves beneath the corresponding head 20 or 21, after which the disc reenters the electrolyte where it takes on another plated coating upon which the continuing sound signals are recorded. This continuous series of events continues for the length of the recording.

The plated coating thickness is controlled by the current flow through the plating system and by the speed of the disc, which determines the time interval a given point on the disc remains in the electrolyte during every revolution. The amplitude of the signal recorded by the head is never high enough to saturate a single layer of the plated magnetic coating. In this way an "onion skin" recording comprising one layer per revolution is obtained. After completion of the recording upon the disc, the reversing switch 26 is operated to its other position whereby the signals developed by the head are then amplified in the amplifier 32 and applied to speaker 35. This time the other switch 24 or 25 in the other section is closed and the other head 20 or 21 is connected across the signal source output so that when a reproduction is made from one of the discs, a recording is placed on the other disc. For this purpose, the discs 14 and 15 are separated by a baffle 37, and the reversing switch 23 is reversed so that the previous cathode becomes the anode and the disc which was the anode during the recording process becomes the cathode. The reverse plating process takes place in the other section. Thus, as the disc 14 in section 1 revolves beneath the reproducing head 20, the signal is picked up before entering the electrolyte before that particular magnetized layer is removed whereby the reproducing head 20 picks up the signal from the succeeding magnetized layers in turn. These signals from the succeeding layers are fed into the amplifier input and amplified. A selected amplitude of the desired amplified signal is taken from the output of the amplifier 32 and recorded on the other disc 15 by the recording head 21 in the same manner as the original recording was made in section 1. The recording on disc 15 in section 2, or in the order of the signal as originally recorded. This is analogous to "rewinding." This system of recording from one section to the other is repeated so long as it is desired to retain the recording in the system.

Although discs 14 and 15 are shown as the carrier of the recording medium, an endless belt may be substituted. When an endless belt is used, it is guided through an electrolyte compartment containing a different electrolyte where it takes on a nonmagnetic coating such as copper, so that alternate layers of magnetic and nonmagnetic coatings are produced on the belt with the recording, however, being only in the magnetic coating.

In the system shown in FIGURE 3, two electro-plating cells are also provided, these cells having the reference numerals 100 and 101. In this case, however, one of the electrodes is a bi-metal electrode, such bi-metal electrodes being represented by the reference numerals 102 and 103. In this system, no moving or rotating elements are involved. The audio signal source for developing audio frequency signals which are recorded is represented by the reference numeral 105 and the plating direct current source by the reference numeral 106. The electrode 102 comprises two electrodes, namely, a nickel electrode 102B and a copper electrode 102A, and these electrodes are interconnected by a switch 108. Similarly, the electrode 103 comprises a nickel electrode 103B and a copper electrode 103A, which are interconnected by a switch 109.

The terminals of source 106 are connected through switch 110 to two input terminals of the reversing switch 112. One of the output leads 113 from switch 112 is connected to the electrode 114 and also to the electrode 103A through switch 115. Similarly, the other output lead 114A from switch 112 is connected to electrode 116 through A.C. filter 117 and also to the electrode 102A through A.C. filter 118.

One terminal of source 105 is connected to lead 113 and the other terminal of source 105 is connected through switch 121 and blocking condenser 122 to the electrode 102A and also through condenser 124 to the voltage dividing network 126. The electrode 114 is coupled to the amplifier 128 through condenser 129 and, similarly, the electrode 116 is coupled to the amplifier 130 through condenser 132.

A calomel electrode 134 is placed in the electrolytic cell 100 adjacent to the electrode 114 and is connected to one terminal of the amplifier 128. Similarly, the calomel electrode 135, placed adjacent the electrode 116, is connected to the amplifier 130.

A switch 136 connects the lead 113 to the voltage dividing network 126. The output terminals of amplifier 128 are applied to the voltage dividing network 137 and, similarly, the output terminals of amplifier 130 are connected to the voltage dividing network 126. Condenser 138 is connected between electrode 103A and the voltage dividing network 137. Electrode 116 is also connected to the voltage dividing network 137 through switch 139. One of the outputs of the voltage dividing network 137 is applied through switch 140 to speaker 142 and, similarly, one of the outputs of the voltage dividing network is applied to the speaker 143 through the switch 144.

In operation of the system shown in FIGURE 3 a recording is first made and for this purpose the switch 110 is closed and the reversing switch 112 is in the position so that a direct current potential is applied across the electroplating cell 100 with the bi-metal electrode 102 positive and the electrode 114 negative. This causes a current to flow through the bi-metal electrolyte in cell 100 and electro-disposition of metal occurs, with the result that a bi-metal coating is plated on electrode 114. For purposes of illustration, this bi-metal system is shown to consist of nickel and copper, but many different bi-metal combinations may be used. In order to procure a recording for these purposes, use is made of the fact that the rate of electro-disposition of different metal varies in accordance with the rate of current flow; in this case, the copper plates at low current density and the nickel at high current density. This different preference of the two metals in electro-disposition is used to record a modulated signal as follows, the source 105 being representative of a modulated signal.

In recording, switch 121 is closed to impress the desired alternating current signal across the electroplating system through the D.C. blocking condenser 122. It is preferred that the maximum potential of the alternating current be less than that of the direct current potential so that current always flows in the direction established by the D.C. source but so that the value always will fluctuate in accordance with the A.C. signal. This is so since in part of the alternating current cycle the alternating current potential is added to the direct current potential and in other parts of the cycle the two potentials are subtracted. The net result is a signal modulation of the direct current. This signal modulation of the direct current then causes a desired fluctuation of the electro-disposition of the different metals in the electrolyte and results in a modulated plating of nickel and copper onto electrode 114.

Different metals establish different electrical potentials in solutions of normal ion concentration or activity. Based on the normal hydrogen electrode as having the value of zero, nickel has an approximate potential of minus 0.23 volt while copper shows an approximate potential of plus 0.34 volt. This is an approximate difference of potential of over 0.5 volt.

This voltage thus varies at any given instant of time according to the ratio of surface of the two metals contacting the electrolyte on the surface of the electrode 114. As this ratio is governed from instant to instant by the impressed A.C. signal which modulates the density of the direct current and hence the proportion in which the meals are deposited, the bi-metal plating on electrode 114 consists of a plated reproduction of the A.C. signal. The alternating potential between the electrolyte and the electrode 114 is detected by the calomel electrode 134 and such voltage is applied to the amplifier 128. In this way the signal may be monitored by speaker 142 as it is plated onto electrode 114.

In order to reproduce or play the plated signal back, the switch 121 is opened to interrupt the A.C. signal and switch 108 is opened to disconnect the nickel electrode 102B from the D.C. source 106. Also, switch 140 is opened to isolate speaker 142. Further, switch 139 is closed to permit any signals from amplifier 128 to be impressed across the plating system 101 through the dividing network 137 and blocking condenser 138. Also, switch 115 is closed at this time and the position of switch 112 is reversed. Then, current flows from electrode 114 to the copper electrode 102A and also in the adjoining plating system 101 from the bi-metal electrode 103 to the copper electrode 116 so that current now flows through both plating systems 100 and 101. The plated recording is now removed from the surface of electrode 114 creating an A.C. potential between electrode 114 and the calomel electrode 134. This signal is fed to the input of amplifier 128 through the D.C. blocking condenser 129. The amplified signal is led from the output of the amplifier 128 through the dividing network 137, the blocking condenser 138, and switch 139, to be impressed at the proper current magnitude which does not exceed the direct current across cell 101 established by the direct current source 106. The D.C. current in plating system 101 is thus modulated in accordance with the plated surface of the electrode 114 and is thus rerouted in reversal of the original plating onto electrode 114. An alternating current signal does exist between electrode 116 and the adjoining electrolyte. This signal is measured by the calomel electrode 135 and applied through condenser 132 to the input of the amplifier 130. The output of amplifier 130 is applied to the speaker 143 for monitoring purposes through the dividing network 126 and switch 144.

By utilizing a small percentage of the amplified signals as described for D.C. modulation purposes, the recording may be transferred between plating systems so as to preserve the recording, allowing the rest of the recording signal to perform useful work such as driving a speaker, meter and the like.

FIGURE 4 illustrates a modification of the system shown in FIGURE 3 in which calomel electrodes are no longer used, but in this case the primary of a repeat coil or transformer is connected in lead 113 which interconnects the electrode 114 with one output terminal of the switch 112. The secondary of the transformer is connected to the input of the amplifier 128 and the amplified output is used as previously described.

FIGURE 5 illustrates another modification of the system shown in FIGURE 3 in that the calomel electrodes are no longer used, but detection of the character of the coating on electrode 114 is attained using an optical system involving a light source 150, photocell 152 and amplifier 153. Light is reflected from the electrode 114 and the photocell 152 thus responds to the varying texture and light reflecting qualities of the plated surface. The output of the photocell 152 is amplified and the output of the amplifier 153 is used as previously described.

FIGURE 6 illustrates still another modification of the system shown in FIGURE 3 in that the calomel electrode is no longer used for measuring potentials, but in this case the electrode 102 is replaced by a pair of electrodes 202C and 202D. The electrode 202C is of radioactive zinc. The electrode 202D is of brass, and the electrode 114, as before, is of copper. Radioactive radiation responsive means 204 serves to measure the instantaneous radioactivity of the electrode 114. The detector 204 may comprise a scintillation type detector and its output is amplified to amplifier 205 for developing an amplified output which is used as previously described.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a sound recording and reproducing system the combination comprising, an electrolytic cell having spaced electrodes, a source connected to said electrodes for electroplating material from one electrode onto the other electrode, an audio source of variable frequency and means connected to said audio source and modulating the flow of material from said one electrode to the other electrode in accordance with sound variations from said audio source to produce a recording of said sound on said second electrode.

2. In a system of the character described, an electrolytic cell including a pair of electrodes, means for producing a current flow between said electrodes, a source of sound variations, means connected to said sound source and modulating said current flow in accordance with sound variations from said source to produce an electrodeposit representative of said sound variations, said sound comprising a source of sound variations connected between said electrodes, an auxiliary electrode spaced from the electrode upon which electro-deposit occurs, and means coupled to said auxiliary electrode for reproducing the voltage difference occurring between said auxiliary electrode and said electrode upon which electrodeposit occurs.

3. In a system of the character described, a pair of electrolytic cells, each of said electrolytic cells comprising a pair of electrodes, means for producing an electro-deposit on one electrode of a pair in accordance with sound variations, and means interconnecting said cells and effective to produce an electro-deposit on an electrode of the other pair in accordance with the electrodeposit of the first mentioned electrode in the first mentioned pair.

4. In a system of the character described, an electrolytic cell comprising a first electrode and a second bimetal electrode, means for producing a continuous current flow between said first electrode and said bi-metal electrode, means for modulating said current flow in accordance with sound variations whereby said first electrode has material deposited thereon from each of the electrodes comprising the bi-metal electrode in an amount representative of said sound variations.

5. A system as set forth in claim 4 in which said bimetal electrode comprises a copper electrode and a nickel electrode and said first electrode comprises a copper electrode.

6. A system as set forth in claim 4 in which said bimetal electrode comprises radioactive material.

7. A system as set forth in claim 4 including a light source for illuminating the first mentioned electrode, a photocell receiving reflected light from said first electrode, and reproducing means controlled in accordance with the output of said photocell.

8. A system as set forth in claim 4 including means sensitive to the current flowing between said first electrode and said bi-metal electrode for reproducing the sound variations.

9. In a system of the character described, a first electrolytic cell and a second electrolytic cell, each of said cells having electrodes, means for recording sound variations on an electrode of the first cell, and means interconnecting said first and second cells and producing a recording on an electrode of the second cell when the previously recorded recording in the first cell is being reproduced.

10. In a sound recording and reproducing system, the combination comprising, an electrolytic cell having spaced electrodes, a source connected to said electrodes for electroplating magnetic material from one electrode onto the other electrode, said other electrode comprising a rotating electrode, means rotating said electrode, and a transducer magnetically associated with said other electrode in magnetic relationship with magnetic material electroplated on said other electrode.

11. In a recording system in which magnetic material from one electrode is electrodeposited on a cooperating electrode in an electrolytic cell, the step comprising changing the magnetization of said magnetic material electrodeposited on said cooperating electrode.

References Cited in the file of this patent

UNITED STATES PATENTS

| | | |
|---|---|---|
| 1,884,512 | Ballard | Oct. 25, 1932 |
| 2,044,415 | Yates | June 16, 1936 |
| 2,373,273 | Sziklai | Apr. 10, 1945 |

FOREIGN PATENTS

| | | |
|---|---|---|
| 496,113 | Great Britain | Nov. 23, 1938 |